(12) United States Patent
Kirchner

(10) Patent No.: US 6,276,498 B1
(45) Date of Patent: Aug. 21, 2001

(54) PISTON FOR A PISTON CYLINDER ASSEMBLY

(75) Inventor: Holger Kirchner, Ruppichteroth (DE)

(73) Assignee: Mannesmann Sachs AG, Schweinfurt (DE)

( * ) Notice: Subject to any disclaimer, the term of this patent is extended or adjusted under 35 U.S.C. 154(b) by 0 days.

(21) Appl. No.: 09/536,358

(22) Filed: Mar. 27, 2000

(30) Foreign Application Priority Data

Mar. 31, 1999 (DE) .............................................. 199 14 557

(51) Int. Cl.[7] .......................... B60G 13/08; B60G 17/08; F16F 9/34; F16F 9/348; F16F 9/32
(52) U.S. Cl. ................... 188/282.5; 188/322.15; 188/322.22; 188/317; 188/280
(58) Field of Search ........................ 188/322.15, 322.22, 188/282.5, 282.6, 320, 317, 316, 280; 137/854, 856, 493, 493.8, 516.15, 512.15, 513.5, 513.7

(56) References Cited

U.S. PATENT DOCUMENTS 4,624,347 * 11/1986 Mourray ........................ 188/322.15
4,821,852 * 4/1989 Yokoya .............................. 188/282.5

FOREIGN PATENT DOCUMENTS

3824420 * 2/1990 (DE) .
19914557 * 11/2000 (DE) .

* cited by examiner

Primary Examiner—Douglas C. Butler
(74) Attorney, Agent, or Firm—Cohen, Pontani, Lieberman & Pavane

(57) ABSTRACT

A piston for a piston/cylinder assembly is fastened to a piston rod and axially movably arranged in a working cylinder filled with damping medium. The piston having damping valves for the tension and compression movements of the piston in the cylinder and having a first and second group of passage ducts respectively for the tension and compression directions. The outlet sides of each of the first and second passage ducts open into a control edge covered by valve disks. The first and second passage ducts run axially parallel over at least part of their length, wherein the inlet and outlet regions of each of the first and second passage ducts being arranged axially one behind the other and one of the first and second groups of passage ducts emerges on the end face and the other of the first and second groups of passage ducts emerges radially outward on each side of the working piston.

11 Claims, 4 Drawing Sheets

PISTON FOR A PISTON CYLINDER ASSEMBLY

BACKGROUND OF THE INVENTION

1. Field of the Invention

The invention relates to a piston for a piston/cylinder assembly in which a working piston fastened to a piston rod is arranged in a working cylinder filled with damping medium, wherein the piston is axially displaceable in the working cylinder and has damping valves for both the tension and compression directions of movement, each damping valve having a group of passage ducts which open on an outlet side at a control edge covered by valve disks.

2. Description of the Related Art

Pistons for hydraulic vibration dampers are already known, for example, from German Utility Model 19 41 188. In these known pistons, a piston body is fastened to a piston rod and has a group of passage ducts for each of the tension and compression directions of movement. Each group of passage ducts runs obliquely relative to the piston rod axis and opens on the outlet side into an annular groove forming a control edge and covered by valve disks. A problem with these prior art devices is that the obliquely running passage ducts cannot be produced together with the piston body because, for example, during sintering, the machining tools cannot be brought parallel to the piston rod axis. For this reason, the passage ducts must be produced in a further manufacturing operation such as, for example, by drilling or by a machining operation such as cutting if the cross sections are not a circular shape.

Other pistons for hydraulic telescopic vibration dampers are known, for example, from German reference DE-C 38 24 420 in which the inner radius of the inflow-side passage ducts is, starting from the piston rod axis, approximately as large as the outer radius of the outflow-side passage ducts. By virtue of this geometry, the passage ducts may be produced by noncutting machining operation, since, in each case, a part of the machining tool can penetrate axially in the direction of the piston rod axis from one end face of the piston body.

All damping systems are required to provide increasing degrees of comfort in vehicles. Comfort is influenced essentially by damping and friction. These comfort requirements, in combination with the required body damping, lead to precisely defined damping characteristic curves which are typically decreasing characteristic curves that have a compression/tension ratio in the lower speed range that does not correspond to the compression/tension ratio occurring at higher speeds. That is to say, the compression damping value at a first damping speed is higher than its corresponding value at a second damping speed and the tension damping value lower at the first damping speed than its corresponding value at the second damping speed. This relationship has an adverse effect on comfort. To generate decreasing characteristic curves, relatively soft spring leaves or helical springs are highly prestressed so that they have high piston gradients. A problem with this solution is that the assemblies become rougher and therefore also louder. This roughness results primarily from the contact of the first spring leaf with the piston surface which occur at the higher speeds, higher forces and higher accelerations during opening and closing associated with highly prestressed springs.

For example, in known level-regulating systems such as disclosed in European Patent EP 0.867.317 Al there are no corresponding solutions, since these devices have large piston pin diameters along with relatively small piston diameters. The result of this configuration is that the area between the piston rod and the piston diameter comprises a small pressure-loaded surface and therefore requires high prestressing gradients to generate decreasing characteristic curves.

SUMMARY OF THE INVENTION

The object of the invention is to provide a piston-cylinder arrangement having tension damping valves and compression damping valves for independently setting the damping characteristics of the compression stage and the tension stage of the piston-cylinder arrangement, including the damping characteristics at low piston speeds, and having valve disks of the tension damping valves and compression damping valves that comprise relatively large pressure-loaded surfaces for generating decreasing damping force characteristic curves.

The object of the present invention may be achieved in that the passage ducts for the compression valve and the tension valve run axially parallel over at least part of their length so that the inlet and outlet regions of each of the passage ducts are arranged axially one behind the other and in that on each axial side of the working piston one group of passage ducts emerge on the end face and the other group of passage ducts emerges radially outward.

When the diameters of the valve disks are as large as possible in this configuration, large pressure-loaded surfaces are created which respond relatively easily and may be used to achieve decreasing damping force characteristic curves.

In a further embodiment, the compression and tension damping valves comprise spring disks.

According to an essential feature of the present invention, the working piston includes at least two parts.

In an embodiment which is simple to manufacture, a part of a wall of at least one group of passage ducts is formed by the outer circumference of the piston rod.

In another embodiment having a simple design, part of the length of the passage ducts is used for both for the tension stage and for the compression stage of movement.

To ensure automated mounting, according to an essential feature of the present invention, the piston rod has a pin onto which the individual parts of the working piston and of the damping valves may be slipped axially one behind the other and fixed thereon.

According to a further embodiment, the working piston may be designed in two parts in which one of the two parts has elements necessary for compression damping and the other part has the elements necessary for tension damping.

According to a further essential feature, there is provision for the working piston to be designed in two parts in which one of the two parts is arranged for guiding and sealing the piston relative to the working cylinder.

A further embodiment comprises valves disks of at least one of the compression damping valve and the tension damping valve having a constant passageway.

The working piston may also be designed with two valve bodies in which a first of the two valve bodies comprises a nonreturn valve.

To achieve high damping forces during a sudden outward deflection of the vehicle wheel, for example when the vehicle wheel falls into a pothole, the passage ducts of the tension damping valve may comprise a cross section which additionally throttles the damping medium at high piston speeds.

Other objects and features of the present invention will become apparent from the following detailed description considered in conjunction with the accompanying drawings. It is to be understood, however, that the drawings are designed solely for purposes of illustration and not as a definition of the limits of the invention, for which reference should be made to the appended claims. It should be further understood that the drawings are not necessarily drawn to scale and that, unless otherwise indicated, they are merely intended to conceptually illustrate the structures and procedures described herein.

BRIEF DESCRIPTION OF THE DRAWINGS

In the drawings, wherein like reference characters denote similar elements throughout the several views.

DETAILED DESCRIPTION OF THE PRESENTLY PREFERRED EMBODIMENTS

Figure 1:
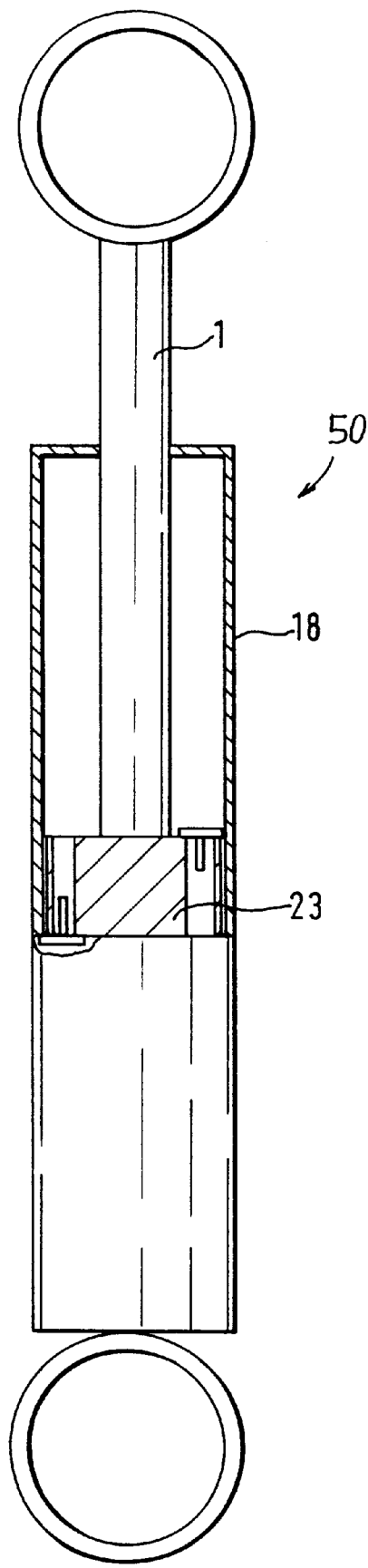
FIG. 1 is a longitudinal sectional view of a piston/cylinder assembly having an embodiment of a piston according to the present invention.

A piston/cylinder assembly 50 illustrated in FIG. 1 comprises a working piston 23 fastened to a piston rod 1 and having valves for tension and compression damping during tension and compression movements of the working piston 23, respectively. The working piston 23 is located in a working cylinder 18. Each of the working cylinder 18 and the piston rod 1 comprise fastening elements for fastening the piston/cylinder assembly 50 between a wheel suspension of a vehicle and an assembly of a vehicle body.

Figure 2:
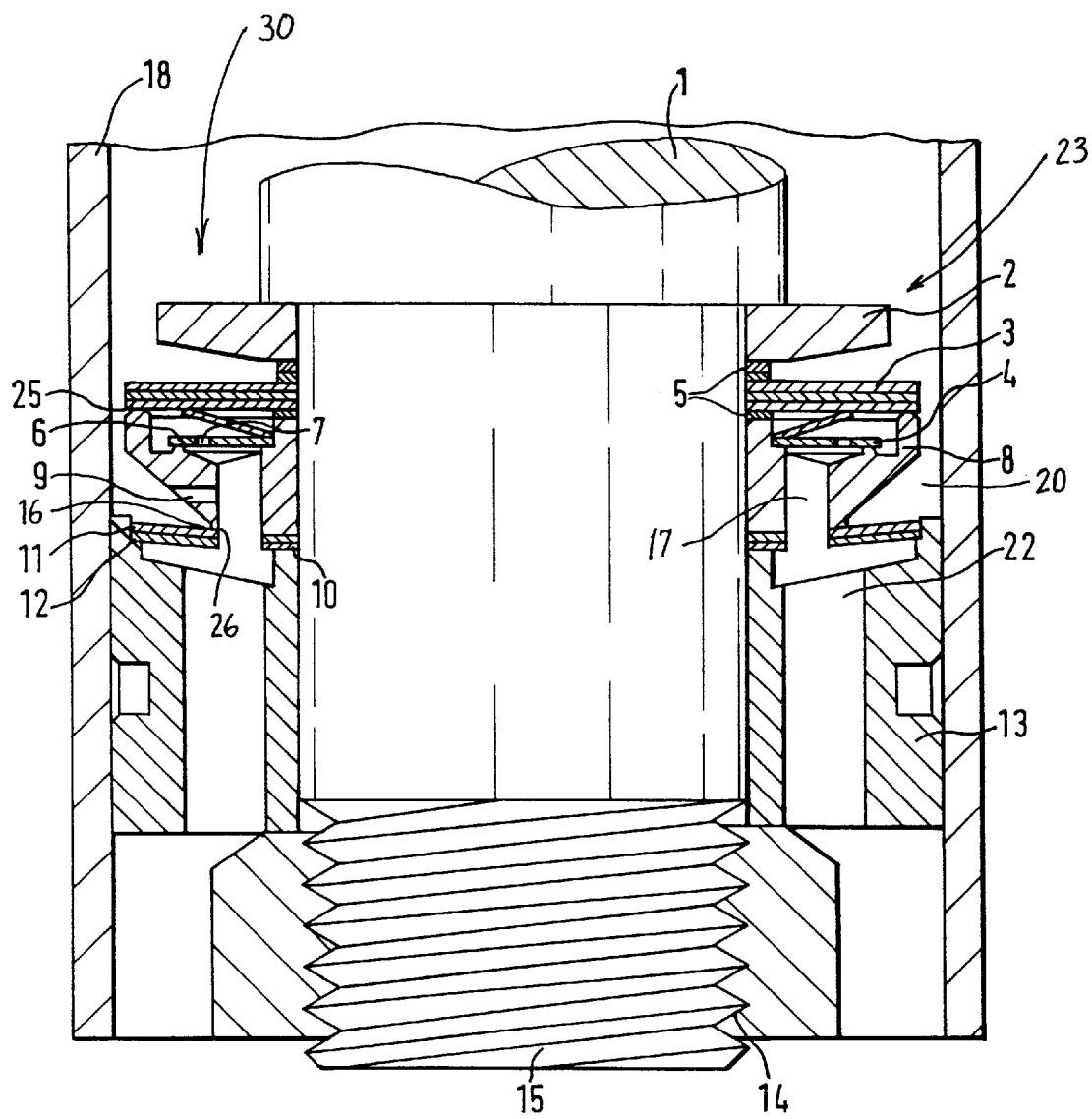
FIG. 2 is a longitudinal sectional view of a piston according to an embodiment of the present invention.

FIG. 2 shows an embodiment of the working piston 23 as an individual part comprising a piston body 30 having a first valve body 8 and a second valve body 13. The working piston 23 is fastened to the piston rod 1 via a piston nut 15 and guided so as to be axially movable and sealed relative to an inner wall of the working cylinder 18. The first and second valve bodies 8 and 13 of the working piston 23 are simple and cost-effective to produce in that they may, for example, be designed as sintered parts capable of being removed from the mold axially. The first valve body 8 performs compression damping and comprises a nonreturn valve 6 while the second valve body 13 performs tension damping and also guides and seals the working piston 23 relative to the working cylinder 18. In the embodiment of FIG. 2, tension damping is generated between the first and second valve bodies 8 and 13 by a tension valve comprising tension damping valve disks 11, 12 which form a valve seat with a control edge 26. Compression damping is generated by a compression damping valve comprising compression damping valve disks 3 which form a valve seat at a control edge 25. Inflow passage ducts 17 and 20 are arranged so as to run essentially axially so that the flow through the first and second valve bodies 8 and 13 is not impeded by detours. In the embodiment of FIG. 2, the inflow passage ducts 17 and 20 join at an outflow duct 22 located in the second valve body 13. That is, the pressure loading and the throughflow of both the compression damping valve disk 3 and tension damping valve disk 11 occurs virtually axially.

The working piston 23 of FIG. 2 is constructed as follows: first, a stop disk 2 is provided on a pin of the piston rod 1 and is followed axially by the compression damping valve disks 3, a valve disk 4 having a constant passageway 7 and spacer disks 5. The valve disk 4 simultaneously forms a non-return valve 6 arranged at the first valve body 8 with the constant passageway 7 for the tension side. Instead of or in addition to the constant passageway 7, a bore 9 in the valve body 8 may also be used as a constant passageway. Furthermore, a third possibility for the constant passageway which may be used in addition to or instead of passageway 7 and the bore 9 comprises a spring leaf 12 arranged with corresponding cutouts and forms with the control edge 25 one or more defined constant passage way 16.

The first valve body 8 is followed by tension damping valve disks 11, 12 which bear on the second valve body 13 and form a valve seat with the control edge 26 of the first valve body 8. To achieve a defined prestress of the tension damping valve disks 11, additional spacer disks 10 may be introduced on the pin of the piston rod 1 between the first valve body 8 and the second valve body 13.

The second valve body 13 includes the outflow ducts 22 through which flow passes for both tension damping and compression damping. All the components mounted on the pin of the piston rod 1 are axially fixed and secured on the pin of the piston rod 1 via a threaded connection 14 and a piston nut 15.

Figure 3:
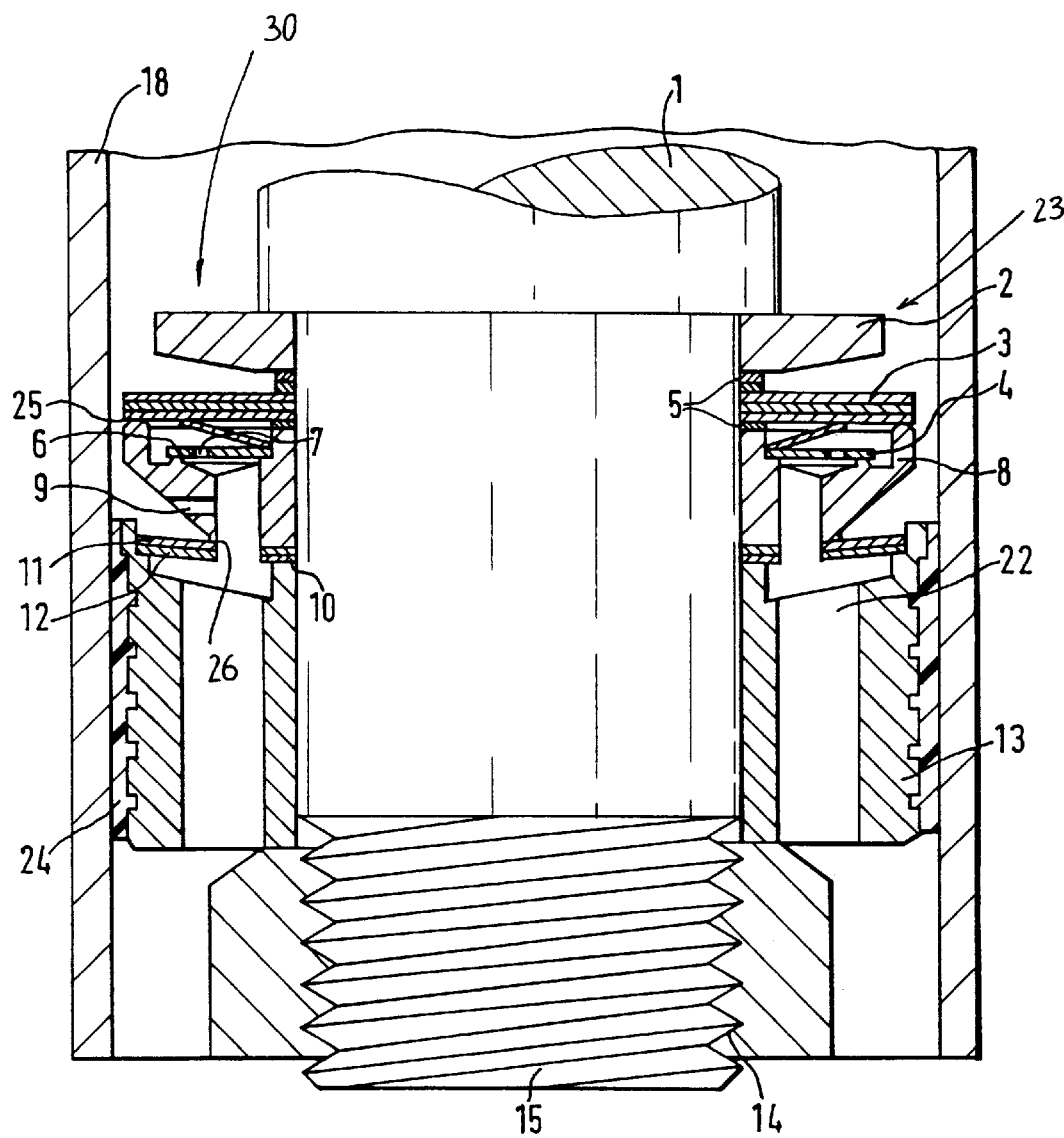
FIG. 3 is a longitudinal sectional view of a piston according to another embodiment of the present invention.

FIG. 3 illustrates a further embodiment which corresponds essentially to the embodiment according to FIG. 2, with the addition of a sealing film 24 arranged on the outer circumference of the working piston 23 for sealing the working piston 23 relative to the working cylinder 18.

Figure 4:
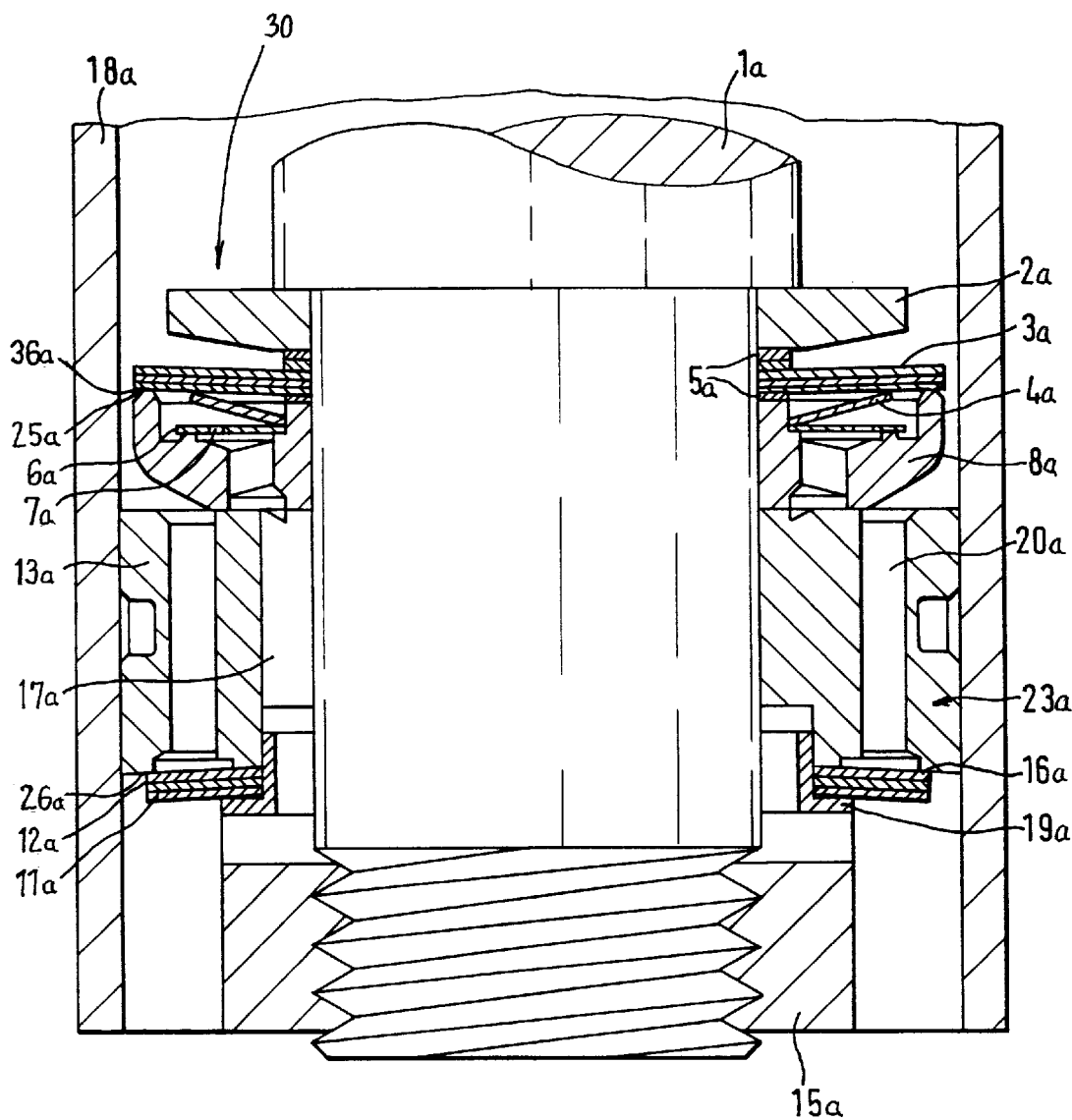
FIG. 4 is a longitudinal sectional view of a piston according to yet another embodiment of the present invention.

FIG. 4 illustrates a further embodiment of the present invention in which components that correspond to those described above with respect to construction and operation are designated by the same reference numbers with a suffix "a". Only the differences between the embodiments of FIGS. 2 and 4 will be discussed.

In this embodiment, separate axial passage ducts 17a and 20a are provided for the compression side and tension side. A further increase in comfort is achieved by slight swirlings of the damping fluid through these passage ducts 17a and 20a. The first valve body 8a is provided with a valve disk 4a with a constant passageway 7a. The constant passageway 7a for the compression stage may optionally also be produced by means of a bore 9 in the valve body 8 as shown in FIG. 2. In the embodiment of FIG. 4, the nonreturn valve 6a is integrated in the first valve body 8 and opens when the flow passes through in the compression direction. The constant passageway 7a (or bore 9 as in FIG. 2) is opened during compression. The nonreturn valve 6a closes during movement of the piston 23a in the tension direction. In addition, this compression valve disk 3a and non-return valve 6a may optionally have one or more orifices for the constant passageway 36a in the tension stage. The constant passageway 16a may also alternatively or additionally be produced by a spring leaf 12a arranged with corresponding cutouts which form defined passage ducts with the control edge 25a. These constant passageways 7a, 9, 16a are coordinated with one another such that optimum comfort is achieved. That is, with a damping ratio of compression damping to tension damping of 1:2 to 1:4, in normal motor vehicles the constant opening ratio should also lie in this range. However, particularly where single-tube damper systems are concerned, this constant opening ratio is around 1:1 because the same volume of flow flows through the damping valve in both the tension and the compression direction. The 1:1 constant opening ratio causes compression damping in the lower speed range to be higher than is actually desirable which results in a loss of comfort. By a controlled adoption of compression and tension constant openings 7a, 9, 16a the damping ratio in the constant opening range may even be made higher than corresponds to the ratio at higher speeds thereby further increasing the comfort achieved.

In the embodiment of FIG. 4, a stop disk 2a is first arranged on the pin of the piston rod 1a and is followed by the first valve body 8a together with its compression damping valve disks 3a which form a valve seat on control edge 25a. The second valve body 13a with its tension damping valve disks 11a is then arranged on the pin so that they form a valve seat with the control edge 26a. All of the components are fixed axially on the piston rod 1a via the piston nut 15a. In this exemplary embodiment, the passage ducts 17a are formed by the outer wall of the piston rod 1a and the inner wall of the second valve body 13a.

The centering of the tension-side spring leaves is obtained by an angle ring 19a. Inflow into the compression-side inflow ducts 17a takes place through ducts or bores in the piston nut, so that minimal swirling of the damping fluid occurs.

The invention is not limited by the embodiments described above which are presented as examples only but can be modified in various ways within the scope of protection defined by the appended patent claims.

I claim:

1. A piston for a piston/cylinder assembly in which the piston comprises a working piston fastened to a piston rod and is axially movably arranged in a working cylinder filled with a damping medium, the piston comprising:

a piston body comprising a first group of passage ducts having an inlet region and an outlet region and a second group of passage ducts having an inlet region and an outlet region;

a compression damping valve arranged in the outlet region of said first group of passage ducts and comprising a compression control edge arranged at the outlet region of said first group of passage ducts and compression valve disks operatively arranged on said compression control edge for forming a valve seat on said compression control edge; and a tension damping valve arranged in the outlet region of said second group of passage ducts and comprising a tension control edge arranged at the outlet region of said second group of passage ducts and tension valve disks operatively arranged on said tension control edge for forming a valve seat on said tension control edge, wherein said first group of passage ducts run axially parallel to said second group of passage ducts over at least part of their length, wherein the inlet and outlet regions of each of said first and second groups of passage ducts are arranged axially one behind the other, and wherein one of said first and second groups of passage ducts emerges on an end face and the other of said first and second groups of passage ducts emerges radially outward on each axial side of said piston body.

2. The piston of claim 1, wherein each of said compression damping valves and said tension damping valves comprise spring disks.

3. The piston of claim 1, wherein said piston body comprises at least two parts.

4. The piston of claim 1, wherein at least one of said first and second groups of passage ducts comprises a wall formed by an outer circumference of the piston rod.

5. The piston of claim 1, wherein a portion of the length of said first and second passage ducts is used for both tension movement and compression movement of the piston.

6. The piston of claim 1, wherein the piston rod comprises a pin and said piston body and said compression damping valve and said tension damping valve are slipped axially one behind the other and fixed on said pin.

7. The piston of claim 1, wherein said piston body comprising said compression damping valve and a second part comprising said tension damping valve.

8. The piston of claim 1, wherein said piston body comprises two parts and a first part of said two parts guides and seals the piston body relative to the working cylinder.

9. The piston of claim 1, wherein at least one of said tension valve disks and said compression valve disks comprises a constant passageway.

10. The piston of claim 1, wherein said piston body comprises two parts and a first of said two parts further comprises a nonreturn valve.

11. The piston of claim 1, wherein said second group of passage ducts comprise a cross section operatively designed for additionally throttling a damping medium flowing therethrough at high piston speeds.

* * * * *